US008374987B2

(12) United States Patent
Weber et al.

(10) Patent No.: US 8,374,987 B2
(45) Date of Patent: Feb. 12, 2013

(54) STATEFUL, CONTINUOUS EVALUATION OF RULES BY A STATE CORRELATION ENGINE

(75) Inventors: Franz Weber, Wiesloch (DE); Matthias Miltz, Heidelberg (DE); Soeren Balko, Weinheim (DE); Andreas Buchen, Mannheim (DE)

(73) Assignee: SAP AG, Walldorf (DE)

( * ) Notice: Subject to any disclaimer, the term of this patent is extended or adjusted under 35 U.S.C. 154(b) by 970 days.

(21) Appl. No.: 12/165,417

(22) Filed: Jun. 30, 2008

(65) Prior Publication Data

US 2009/0327199 A1 Dec. 31, 2009

(51) Int. Cl.
*G06N 5/02* (2006.01)
(52) U.S. Cl. ........................................... 706/47
(58) Field of Classification Search .................. 706/47
See application file for complete search history.

(56) References Cited

U.S. PATENT DOCUMENTS 6,336,139 B1   1/2002   Feridun et al.

OTHER PUBLICATIONS

Berstel et al ("Reactive Rules on the Web" Reasoning Web 2007).*
Norman Paton ("Supporting Production Rules Using ECA-Rules in an Object-Oriented Context" 1995).*
European Patent Office (EPO) Extended European Search Report (EESR) dated Jul. 30, 2009, issued in connection with counterpart application 09006726.5-1225.
Wang et al., "An ECA-Rule-Based Workflow Management Approach for Web Services Composition", Grid and Cooperative Computing—GCC 2005 Lecture Notes in Computer Science; LNCS, Springer, Berlin, DE, vol. 3795, pp. 143-148, Jan. 1, 2005.
Chet et al., "Complex Event Processing Using Simple Rule-based Event Correlation Engines for Business Performance Management", E-Commerce Technology, 2006, The 8$^{th}$ IEEE International Conference on and Enterprise Computing, E-Commerce, and E-Services, The 3$^{rd}$ IEEE International Conference on San Francisco, CA, pp. 3-3, Jun. 26, 2006.
Elmasri et al., "Fundamentals of Database Systems", Jun. 2000, Addison-Wesley, USA. ISBN 0-8053-1755-4.
Forgy, "Rete: A Fast Algorithm for the Many Pattern/Many Object Pattern Match Problem", Artificial Intelligence, 19, pp. 17-37, 1982.
Li et al., "Multiprocessor Main Memory Transaction Processing", Databases in Parallel and Distributed Systems, 1988. Proceedings. International Symposium on Volume, Issue, Dec. 5-7, 1988, pp. 177-187.
Luckham, "The Power of Events: An Introduction to Complex Event Processing in Distributed Enterprise Systems", May 8, 2002, Addison-Wesley, USA.

* cited by examiner

*Primary Examiner* — Lut Wong
(74) *Attorney, Agent, or Firm* — Mintz, Levin, Cohn, Ferris, Glovsky and Popeo, P.C.

(57) ABSTRACT

Methods and apparatus, including computer program products, related to stateful, continuous evaluation of event-condition-action rules by a state correlation engine. In general, one or more events may be determined to have occurred and an event-condition-action cycle may be caused to be processed for the events. The event-condition-action cycle may include evaluating condition networks based on a state of execution of the state correlation engine that includes the events, where the state of execution is based on a state of execution before the events, and enabling the actions to be executed if evaluation of the condition networks with the state of execution is to result in one or more actions being enabled.

15 Claims, 6 Drawing Sheets

STATEFUL, CONTINUOUS EVALUATION OF RULES BY A STATE CORRELATION ENGINE

BACKGROUND

The present disclosure relates to data processing by means of a digital computer, and more particularly to stateful, continuous evaluation of rules by a state correlation engine.

In general, different paradigms may be used to implement business processes in computers. For example, business process modeling languages may be used to implement business workflows in enterprise systems. An example of a standard for modeling languages may be Business Process Modeling Notation, which provides a set of modeling notations to follow when modeling a business process in accordance with a workflow that follows a control flow based paradigm. In the past, a workflow engine may handle execution of an executable instance of a model of a business process.

SUMMARY

The subject matter disclosed herein provides methods and apparatus, including computer program products, that implement techniques related to stateful, continuous evaluation of rules by a state correlation engine.

One general aspect includes determining an event has occurred, causing an event-condition-action cycle to be processed for the event, determining another event has occurred, and causing another event-condition-action cycle to be processed for the other event. The event-condition-action cycle includes evaluating condition networks based on a state of execution of a state correlation engine that includes the event, and enabling an action to be executed if evaluation of the condition networks with the state of execution is to result in an action being enabled. The other event-condition-action cycle includes evaluating the condition networks based on another state of execution of the state correlation engine that includes the other event and the event, and enabling an action to be executed if evaluation of the condition networks with the other state of execution is to result in an action being enabled.

A related aspect includes determining one or more events have occurred and causing an event-condition-action cycle to be processed for the events. The event-condition-action cycle includes evaluating condition networks based on a state of execution of the state correlation engine that includes the events, where the state of execution is based on a state of execution before the events, and enabling the actions to be executed if evaluation of the condition networks with the state of execution is to result in one or more actions being enabled.

A related aspect includes determining one or more events A have occurred, causing an event-condition-action cycle to be processed for the events A, determining one or more events B have occurred, and causing an event-condition-action cycle to be processed for the events B. The event-condition-action cycle for the events A includes evaluating condition networks based on a state N of execution of a state correlation engine including the events A, and enabling actions X to be executed if evaluation of the condition networks with the state N of execution is to result in actions X being enabled. The event-condition-action cycle for the events B includes evaluating the condition networks based on a state M of execution of the state correlation engine including the events B, where the state M of execution is based on the state N of execution, and enabling actions Y to be executed if evaluation of the condition networks with the state M of execution is to result in actions Y being enabled. A, B, N, X, M, and Y may represent reference lettering such that, for example, the events A and B may be a same or different type of events. The reference lettering may be similarly replaced with reference numerals, and the referencing may be used to distinguish among different phrases for proper antecedent basis such that a same thing is properly referenced.

The subject matter may be implemented as, for example, computer program products (e.g., as source code or compiled code tangibly embodied in computer-readable media, such as a storage media), computer-implemented methods, and systems.

Variations may include one or more of the following features.

An action may be executed asynchronously. Execution of the action may be triggered by a dedicated scheduler component.

An event may be caused by an occurrence outside of a system performing the processing of event-condition-action cycles, or caused by execution of an action resulting from evaluation of another rule.

An event (e.g., an event object or other computer-implemented representation of an event) may represent a generation of a state variable in a state of execution of a state correlation engine; a change of values of a state variable in the state of execution of the state correlation engine; or a deletion of a state variable in the state of execution of the state correlation engine.

An instance of a type of object to be a state variable may be generated. An event to represent a generation of an instance may include an image of the instance. Evaluating condition networks may include flooding the condition networks with the event. Thus, an instance of a type of object may represent state information. The instance may be generated, altered, or deleted to reflect changes in state. To reflect changes to an instance (or, in implementations, to indicate changes to be made to an instance), such as generation, alteration, or deletion of an instance, events may be generated and those events may be represented by a combination of a before image and an after image of the instance such that the combination of images reflects the changes to the instance (e.g., an object called an alter event that includes a combination of before and after images may represent a state change event that altered a value of an instance from one value to another). The images may include copies of selected attributes of the instance to represent a before or after state of an instance. An instance may be changed as part of performing an action corresponding to the successful evaluation of a condition network.

A combination of other instances and condition networks may make up a state of execution of a state correlation engine. The state may be stored in main memory.

Condition networks may be part of network representations of event-condition-action rules. Each network representation of an event-condition-action rule may include a combination of source nodes representing types of events, operator nodes representing conditions, and target nodes representing one or more actions to be executed.

Condition networks may be directed acyclic graphs of operator nodes.

Source nodes may be represented as types of objects of a type language corresponding to types of images of events. Condition networks of operator nodes may be evaluated as far as possible for types of events that correspond to types of source nodes based on relationships between source nodes and the condition networks.

At least one target node may correspond to code describing one or more actions to be executed asynchronously upon enablement of the at least one target node. At least one target node may include a script in accordance with a scripting language to describe one or more actions to be executed asynchronously upon enablement of the at least one target node, where the enablement is based on successful evaluation of operator nodes connected to the target node.

Types of operator nodes may include a filter operator node type, a join operator node type, a cross product node type (which may be referred to as a Cartesian product operator node), and a projection node type (e.g., nodes that represent the relational algebra operation of projection (which may be referred to as "swizzle" nodes)). There may be further types of operator nodes. Join and Cartesian product operator nodes may be implemented to include two inhibitor channels corresponding to the left (or right, respectively) outer join minus natural join between the states from both input channels. Target nodes may describe transactions or actions to be performed upon evaluation of operator nodes connected to corresponding target nodes.

Rules may be processed independent of one another. Thus, event-condition-action cycles may overlap and need not be adjacent to each other (e.g., there may be concurrency of rule evaluation). For example, as one rule is being processed other rules may be triggered. Events might not trigger an action, or may trigger an enabling of an action or a disabling of an action, where an enabling or disabling of an action may result in executing or not executing the action, respectively.

The subject matter described herein can be implemented to realize one or more of the following advantages. A target model for execution of a business process may be in accordance with a language that includes networks of nodes that represent event-condition-action rules where the networks are derived from Rete-based networks of nodes. The target model for execution may be derived from one or more other paradigms that may be referred to as source paradigms. Engines tailored to a specific higher-order paradigm (e.g., a flow-based paradigm) may suffer from (1) performance issues (as it may be, in general, difficult to efficiently support a whole extent of semantically rich artifacts), and (2) flexibility constraints and integration issues with orthogonal paradigms (e.g., combining workflows using business rules may cause integration issues). In contrast, workflow patterns of a source model may be easily mappable to the target model due to the target model being semantically poor (e.g., simply involving event-condition-action rules that can be executed in a transactionally safe manner), and a state correlation engine to execute the target model may be optimized to efficiently execute the paradigm of the target model. For example, a state correlation engine may be optimized to efficiently support target model representations of condition evaluations as may be found in various workflow patterns, such as "multiple choice" (e.g., BPMN: OR-split), "deferred choice" (e.g., BPMN: pick-split), message receipt (e.g., BPMN: intermediate message event), and the like. And, due to the mappability from other paradigms to the paradigm of the target model, interoperability between different paradigms of business applications (including workflow engines, complex event processing/business activity monitoring, and state tracking) may be improved. The state correlation engine may use adapters to receive events which may provide a degree of separation that allows for extensibility to many types of incoming or outgoing events, and the ability to create or consume events without having to change a kernel of the state correlation engine.

A state correlation engine may store a state of execution of rules, which may be represented by a combination of one or more of selections of condition network channels within rules (e.g., including enablement of transactions and enablement of branches of a condition network), a state of operator nodes (e.g., as described below joins and Cartesian product operator nodes may store a state of execution), and instances of state variables, to provide for statefulness across evaluation of rules such that events (e.g., in the sense of event objects or more broadly in the sense of occurrences that may result in event objects that characterize the occurrences) from different points in time may be correlated. The retention of state may result in significant performance improvements as whenever an event happens (e.g., in the sense of an occurrence that is to result in a change to an instance of an object), the event may be correlated against the whole state (which has not necessarily changed in a transaction) without having to "flood" an overall network with a whole state (which may be significantly large). In addition, statefulness of execution may allow for execution of rules to propagate to the further execution of other rules (which may be referred to as chaining of evaluation of rules) such that, in combination, there is a stateful, continuous evaluation of rules. By allowing stateful transitions across networks representing rules, a modularity of rules may be improved such that large, intricate networks expressing complex, detailed rule patterns that take into account many branches of evaluation need not be generated and combinations of simpler rules that individually take into account a state of execution of a state correlation engine may be modeled. The simpler rules may reduce a memory footprint of rules which may improve the ability to keep many rules resident in main memory for quick execution.

In addition, state tracking, event correlation, and other paradigms (e.g., rule evaluation) may be combined in one engine, which may provide seamless interoperability of various paradigms without loosing an expressive power of the paradigms (e.g., the model of execution in accordance with the networks of event-condition-action rules may vary from a language used to model the rules which may be more expressive or suit different purposes, and multiple paradigms may be used to model rules which may become part of a single, event-condition-action paradigm at run-time, which may be made possible by having an intermediate mapping step which transforms a source model (in one or more paradigms) to the target model that follows an event-condition-action paradigm); avoid runtime overhead related to communication and synchronization of the different engines for different paradigms; allow for unified approaches from a tooling side of Business Process Management problems; lower total cost of development as integration need not be done across paradigms; lower total cost of operation as only one engine may be operated; and result in little or no runtime inconsistencies across paradigms as there may be a single execution paradigm. Thus, a multi-purpose state correlation engine may execute very different paradigms such as (1) complex event processing, (2) business processes (control-flow based paradigms), (3) status and action models (a.k.a. state charts), (4) business rules, and the like. In addition, there may be a strict abstraction of run-time-related problems such as concurrency, transactionality, persistency/recoverability, cluster-enablement, and the like from actual business semantics of workflows, rules, complex event processing, and other paradigms. For instance, a workflow artifact for synchronizing parallel flows may be as simple as formulating an event-condition-action rule that checks for the existence of multiple "Token" (which is a type defined in the target model) instances in a particular state, thus inherently taking advantage of an existing locking behavior of a target model.

Details of one or more implementations are set forth in the accompanying drawings and in the description below. Further features, aspects, and advantages will become apparent from the description, the drawings, and the claims.

DETAILED DESCRIPTION

Figure 1:
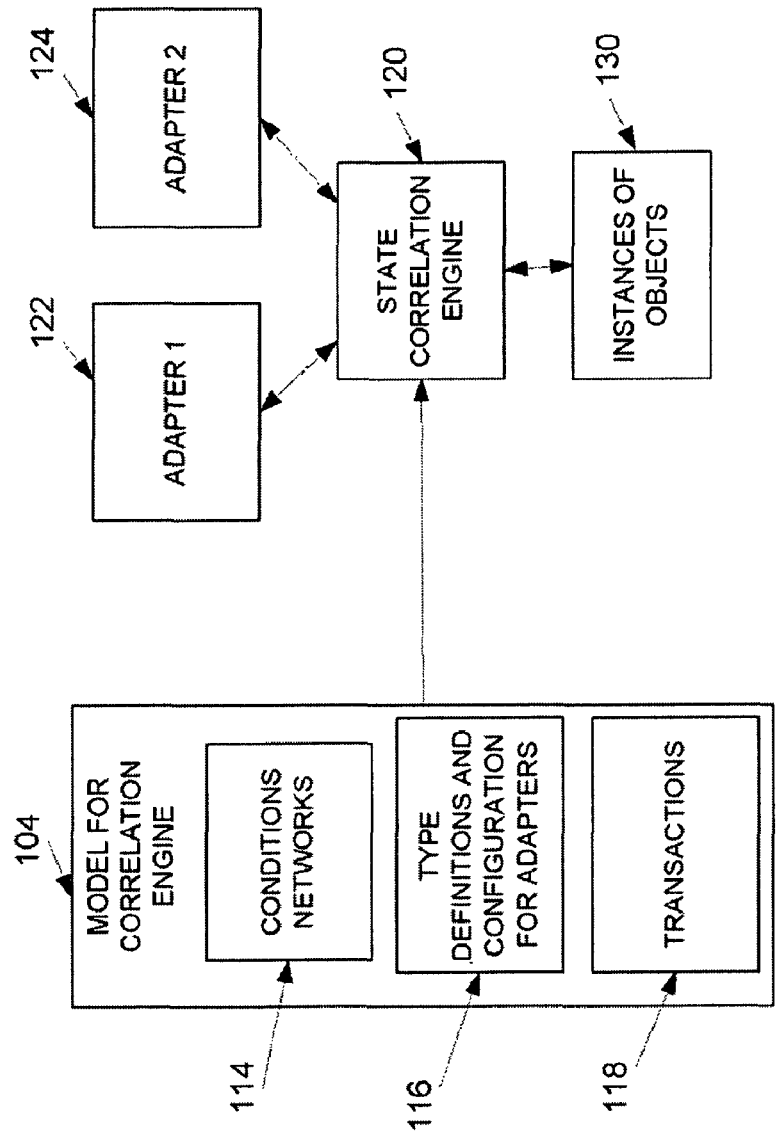
FIG. 1 is a block diagram of a system including a state correlation engine.

The description with reference to FIGS. 1-5 includes a description of a state correlation engine, which may also be referred to as a "correlation engine." In general, a state correlation engine as described in the following text may be a component of a system that processes event-condition-action rules that represent a process. The correlation engine may process the rules to effectively correlate a state of execution of the process represented by results of execution of rules with new events (e.g., new, incoming events).

The state correlation engine described with reference to FIGS. 1-5 may provide for continuous execution of rules by being continuous in the sense that execution of rules may be triggered by the execution of earlier rules which may result in further execution of rules. For example, a first rule R1 having a first action A1 may be executed as a result of a first event E1. Execution of the first rule R1 may result in the execution of the action A1, where the action A1 involves changing a state variable V1 from zero to one. The change of the state variable V1 may cause a state correlation engine to generate an event E2 that includes a before image with V1 as zero and an after image with V1 as one. The event E2 may be flooded in all rules, which may cause a second rule R2 to be executed, where the second rule R2 requires the event E2 before it is executed. As a result of the execution of R2, a second action A2 may be executed, which may result in an event E3, which may, in turn, cause another rule to be executed.

The state correlation engine may further provide for stateful execution of rules in the sense that a state of execution may be retained across execution of rules (e.g., information about state may be retained across execution of rules and changed according to actions of rules or otherwise as a result of events). State may be retained by a combination of one or more of retaining state variables of instances of objects of a type language, retaining a state of selections of condition network channels within rules (e.g., including enablement of transactions and enablement of branches of a condition network), and a state of operator nodes (e.g., retaining tables in joins and Cartesian product operator nodes across events).

Although the term event may be used in the following description to refer to an event object, which may be an object of an object-oriented or other type of data structure of another type of computer-implemented language, where the event object may be implemented as a combination of images of objects of a type language, the term event may also refer to an event in a broader sense, which may be an occurrence or happening. For example, an event may be the receipt of a message which may cause the generation of an event object (which may also be referred to as an event).

Although ordinal numbers such as first, second, and the like may, in some situations, relate to an order; as used in this document ordinal numbers do not necessarily imply an order. For example, ordinal numbers may be merely used to distinguish one item from another. For example, to distinguish a first event from a second event, but need not imply any chronological ordering or a fixed reference system (such that a first event in one paragraph of the description may be different from a first event in another paragraph of the description).

FIG. 1 is a block diagram of a system 100 including a state correlation engine 120. In general, the state correlation engine 120 may execute models of a business process or other high-order paradigms that are represented by event-condition-action rules which in turn may be represented as networks of events, conditions, and actions, such as a model 104 for a correlation engine. The model 104 for a correlation engine may be derived from one or more paradigms for modeling business processes, such as a control flow based modeling language, such as Business Process Modeling Notation (BPMN) or BPEL (Business Process Execution Language). The model 104 for a correlation engine may be mapped from other paradigms due to its use of basic building blocks from which modeling constructs of other modeling paradigms may be mapped.

In general, operation of the system 100 may be as follows. The correlation engine 120 may take the model 104 for a correlation engine as input and execute the model 104 with use of a first adapter 122 and a second adapter 124 that may provide connectivity to business systems. The model 104 for a correlation engine includes a combination of condition networks 114, type definitions and configurations for adapters 116, and transactions 118. The first and second adapters 122, 124 may connect the correlation engine 120 with external systems, parties, or both (e.g., there may be an adapter to send and receive electronic mail or an adapter to consume web service calls). They may be called adapters in the sense that they may provide a layer to transform communications between a correlation engine and outside components, such as other systems.

Execution of the model 104 for a correlation engine may be prompted by events received by one or both of the first and second adapters 122, 124 or in response to other stimuli (e.g., after start-up of the state correlation engine 120 as part of a normal procedure or in response to a remote procedure call to the state correlation engine 120 that arrives at an adapter tailored to the event of an incoming remote procedure call for the purpose of starting execution of a model).

Execution of the model 104 by the correlation engine 120 may include performing process cycles where a cycle includes selecting sources nodes that correspond to events (e.g., selecting source nodes that are indicated as being for an instance of a type that matches a type of instance of images of an event); evaluating condition networks of the rules to determine transactions to be performed (e.g., transactions may be enabled or disabled in implementations that enable or disable transactions based on successful evaluation of condition networks with a "create"/"alter" or "delete"/"alter" update, respectively (e.g., an alteration may cause a successful or unsuccessful evaluation of a rule)); and performing transactions of the rules that correspond to conditions that are successfully evaluated (e.g., a correlation engine may cause execution of enabled transactions and not cause execution of transactions that are disabled). A cycle may be initiated by an event that causes an instance of an object of an object (e.g., type) language that correspond to the event to be generated (whether an event exterior to the system 100 or generated by the system 100, such as an event generated by a previous transaction), such as generating instances of objects 130 in response to events received at the first adapter 122, or by transactions that otherwise update an object (e.g., by altering or deleting an object).

As discussed above, the model 104 for a correlation engine may include a combination of condition networks 114, type definitions and configurations for adapters 116, and transactions 118. A combination of condition networks 114, type definitions and configurations for adapters 116, and transactions 118 may represent elements of a workflow model or another higher-order paradigm from which the model 104 for a correlation engine is derived. In particular, elements of a workflow model may be mapped to the combination of components that represent the model 104 for a correlation engine. For example, a type of gateway of a workflow model, such as an and-split gateway may have a corresponding representation as a network of nodes representing an event-condition-action rule to which the and-split gateway may be mapped when generating the model 104 for a correlation engine.

One or more network representations of event-condition-action rules may make up the model 104 for a correlation engine, where the networks may be linked together to form a model of a process that is semantically similar to a business process representable in another modeling paradigm, such as a workflow modeling paradigm. Each network representation of event-condition-action rules (which may be referred to as trigger networks) may follow a paradigm where there are generally three types of nodes, where the types of nodes include source nodes, operator nodes, and target nodes. Following that paradigm, for an event-condition-action rule the type definitions 116 may be source nodes that represent events (e.g., state changes), the condition networks 114 may be operator nodes that represent conditions and may be represented as directed, acyclic graphs of operator nodes, and the transactions 118 may be target nodes that represent actions.

The type definitions 116 may be defined in accordance with an object-oriented language type system where different types of objects represent different types of events. For various reasons, such as performance reasons, the language may be limited with a restricted type system (targeted on correlation) and foreign keys (cross-object associations). A combination of types of source nodes corresponding to types of instances of state variables which are based on the type definitions 116 may define an event component of an event-condition-action rule. At run-time, a correlation engine may flood all source nodes with events of their respective types for all rules (e.g., an event having images of an instance of type "Message" may be used to flood a network having a source node for the type "Message"), which may cause all condition networks corresponding to all of those events to be evaluated as far as possible. For example, if a rule has three source nodes that correspond to three types of state variables, if only one or two of the variables are changed such that only one or two events are generated, the condition networks following the events will still be evaluated. Type definitions may be adapter-governed such that a type definition may correspond to a type of event received by an adapter such that when an adapter receives an event, an object (also referred to as an instance of a type) corresponding to a type definition is generated.

Networks of nodes that represent rules may resemble Rete networks that resemble execution plans in database query optimizers. However, unlike many Rete implementations, the networks of nodes may operate on state changes, where state changes may include changes to variables that represent a state of a correlation engine and state changes include generation, alteration, or deletion of an instance of a variable and there may be an event that is generated for each type of state change. For events, each event may include a "before image" and an "after image" that reflect a state before and a state after a change, respectively. As mentioned above, there may be three types of events, namely create (or generate), delete, and alter events that represent the information that a state variable was created, removed, or has changed its value. The types of a type system may act as "entry points" to a network representation of a rule. That is, one or more events may enter a network at nodes that correspond to their types (e.g., events may enter at the source nodes referred to above). While being pushed through the network, events may be combined, split, and their before/after parts may be cut off. For example, a join operator may combine two events based on matching key values in their before and after image. In implementations, except for joins and Cartesian products, all types of operators may be stateless (i.e., do not hold extra state information). Contrariwise, joins may maintain a match table of previously seen after images. In this way, they may combine events from different network traversals and, thus, implement correlation scenarios where to-be-matched state variables are created at different points in time (in different transactions).

An adapter configuration may define a customization of an adapter to influence aspects of an adapter's runtime behavior. An adapter configuration may be a semi-structured data for custom interpretation by an adapter. As examples, an adapter configuration may include an address to which emails have to be sent; a web service endpoint and operation that is to be used in a web service call; mapping instructions (e.g., an eXtensible Stylesheet Language Transformation script) that are to be performed in a mapping step; and type information (e.g., as eXtensible Markup Language Schema Definition) that is used to hold business data.

The condition networks 114 are condition networks in the sense of being directed, acyclic graphs, similar to Rete networks, of nodes where each node may represent an operation to be performed as part of evaluating a condition network and the nodes of the network are combined in a network to define a flow of evaluation. The conditions networks 114 may be directed, acyclic graphs of operator nodes where each operator may have different semantics and arity. A type of an operator node may represent an atomic predicate. Types of atomic predicates and their operator nodes may include constant selection, which may be represented by a filter operator node and may be used to determine whether an attribute of an instance matches certain criteria; inner join, which may be represented by a join operator node and may be used to generate pairs of instances with the assistance of an internal table having columns to represent pairs to match according to a key; projection, which may be represented by a swizzle operator node and may be used to map a sequence of instances to another sequence; and negated existence quantifier, which may be represented by an inhibitor operator node. Of the types of nodes, only a few nodes may hold state (joins/inhibitors); however, a correlation engine in general holds all instances (of the declared types) that exist at a given moment. Operator nodes may treat before and after images of events differently, possibly cutting off either of them and forwarding a structurally modified event. Finally, operators (such as joins) may combine events from multiple inputs and their intra-operator state (which contains after images from previously seen events). Thus, events may grow in size and refer to multiple state variables (even of different types).

By combining a selection of types of operator nodes, a condition network of a rule may represent a complex First Order Logic (FOL) expression. For example, a condition network for an AND-merge construct may represent a FOL expression of: exists Token T1, T2, exists Instance I with T1.owner=I and T2.owner=I and T1.state=<after Task1> and T2.state=<after Task2>.

The transactions 118 may result in events that update information of instances of types, where the events may include creating, deleting, or altering information of a type instance. In addition to updating information of instances of types, the transactions 118 may invoke functions on instances of types, which may include calling a custom functionality in an adapter that governs a type. In general, the transactions 118 are executed as a result of evaluation of a condition network. The transactions 118 may be platform independent such that correlation engines on different platforms may interpret and execute the same transactions due a separation between the language expressing the transactions and an underlying platform of a correlation engine (e.g., there may be a platform-independent scripting language). The transactions may have signatures where typed parameters appear in a certain order (e.g., a signature may include a combination of parameters that are understood to be input to a transaction). Also, transactions may have names, may be a result of evaluation of conditions (according to the ECA paradigm), and be represented as dedicated nodes in a network. For example, events may be propagated through a network and filtered/combined by the filters/joins, respectively, that are traversed along the way from the source to the action nodes. Whenever an event that represents a creation of an instance of a state variable (or a "delete," respectively) event arrives at an action node, a transaction instance may be enabled (or, disabled, respectively). This enabling (or disabling) may be a characteristic of a correlation engine, where any enabled transaction may be repeatedly scheduled for execution until it is disabled as a result of a single update enabling a transaction. The disabling mechanism may be identical to the enabling mechanism and bases on the traversal of events thru a network (as an evaluation of conditions). Functions that are part of transactions may be extension points (e.g., for adapters) to implement custom operation for a certain type. Examples of custom operations that may be implemented as part of a function might include sending emails, invoking web services, delegating tasks, performing mappings (data transformations), and the like.

As discussed above, the correlation engine 120 may execute the model 104 in response to an event generated by one of the adapters 122, 124 or in response to other events generated as a result of state change (e.g., a transaction of another event-condition-action rule may cause an event). In addition to adapters receiving information to generate an event of a state correlation engine, adapters may be used to generate output and otherwise perform operations for the correlation engine 120. For example, execution of an action of a rule may cause an adapter to generate a web service call to another system.

As discussed above, the instances of objects 130 are instances of objects of an object-oriented language where different types of objects may represent different types of events or state attributes, and different instances of types of objects may represent different instances of events or instances of state attributes. A combination of instances of objects may make up a state of the state correlation engine 120 such that at any given point of time the state of the correlation engine 120 may be considered to differ based on a different combination of instances that make up a state or different values of those instances. The instances may be used to make up computer-implemented events of the state correlation engine, where the computer-implemented events may have a combination of images including a before image of an instance including attributes of the instance before a change of state of the instance and an after image including attributes of the instance after a change of state of the instance. An event may be generated as part of a transaction (e.g., after successful evaluation of a condition network an instance may be changed, which may result in an event having before and after images of the instance) or in response to the receipt of outside information that causes an event to be generated (e.g., an adapter may make changes to instances resulting in events), and events may include generating, altering, or deleting an instance. For example, upon receiving a message from an external business system, a new instance of a type (e.g., of a type "Message" for a type language having a message type) may be generated and a corresponding event for the type may be generated, where the event includes empty attributes for a before image and non-empty attributes for the after image (e.g., where all or some of the attributes of the instance of the message type are transposed to the after image; e.g., only those attributes that change may be transposed to an image).

As an example of implementation of a business process to be executed by the correlation engine 120, the correlation engine 120 may perform a correlation between subscribers and published messages, which may be referred to as message correlation. In particular, multiple consumers may receive a message based on individual correlation criteria. For example, each party of a messaging system including one or more enterprise systems may specify messages it wants to receive by using a "Subscription" object having a "customer_id" attribute whose value must match a respective counterpart in the "Message" objects. A correlation scenario may be implemented using a join operator to match events from two channels. By doing so, it may combine events referring to "Message" and "Subscription" types pair-wise. As joins are stateful operators, they may keep after images of events from different rounds in an internal table where the events corresponding to different messages and subscription instances may arrive at different points in time.

Figure 2A:
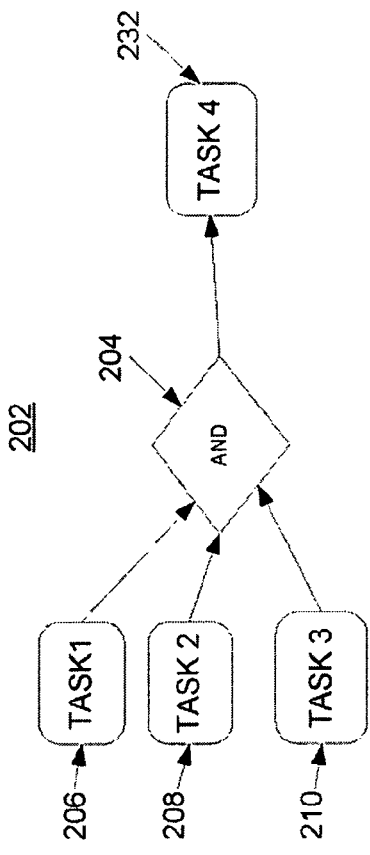
FIG. 2A is a diagram of a workflow model including a synchronization control flow pattern.
Figure 2B:
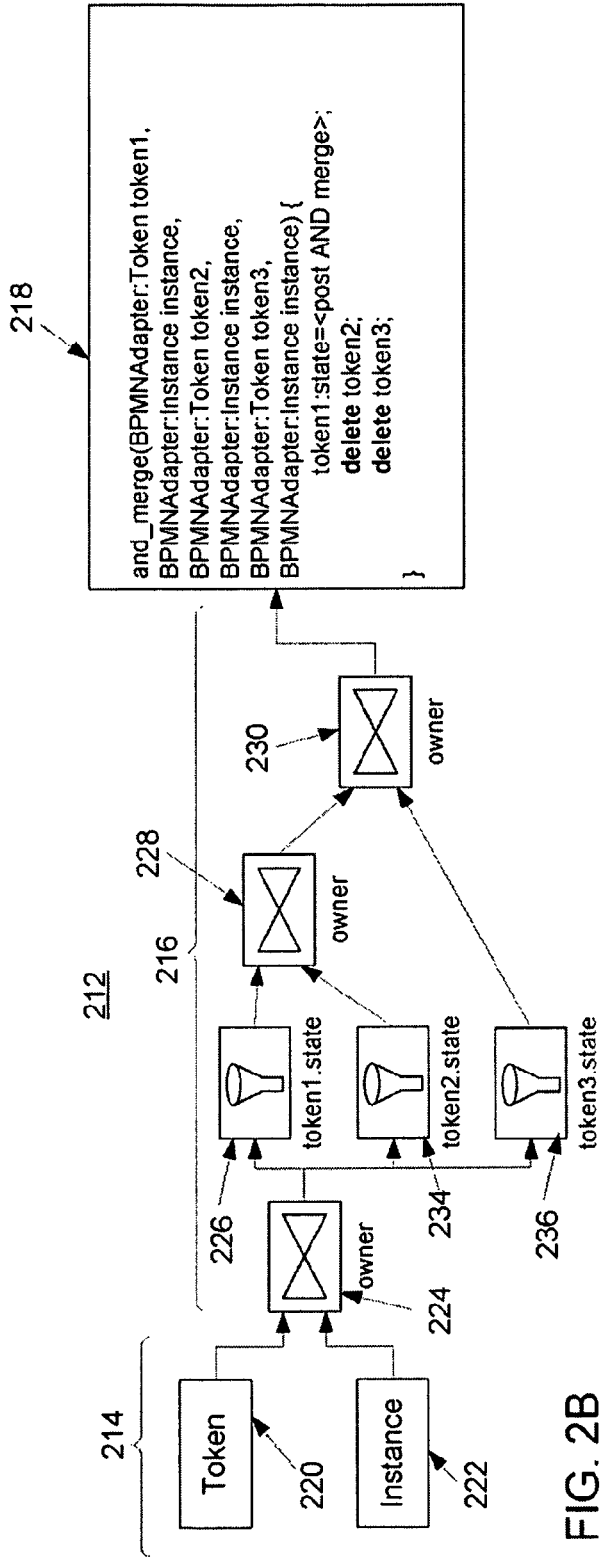
FIG. 2B is a diagram of an event-condition-action rule of an and-merge gateway for execution by a state correlation engine.

In general, FIGS. 2A-2B include models that represent modeling language constructs of different paradigms and may be used to illustrate how a network representation of event-condition-action rules may implement logic of a business process that may be modeled in another paradigm. A network representation of event-condition-action rules may be executed by a state correlation engine, such as the state correlation engine 120 of FIG. 1.

FIG. 2A is a diagram of a workflow model 202 including a synchronization control flow pattern 204. In general, a synchronization control flow pattern may be a modeling construct of a workflow based modeling language where a combination of any number of threads of execution may be synchronized to a single thread of execution. For example, the workflow model 202 may represent that a thread of the first task 206, a thread of the second task 208, and a thread of the third task 210 may be synchronized to a fourth task 232 such that execution of the task 232 must not commence before the other tasks are completed.

FIG. 2B is a diagram of an event-condition-action rule 212 of an and-merge gateway for execution by a correlation engine. In general, the event-condition-action rule 212 is composed of three parts, including types 214 (which may be referred to as source nodes and may correspond to instances of a state variables from which different types of events are derived), a condition network 216 (which may be referred to as operator nodes and be in the form of a directed, acyclic graph), and transactions 218 (which may be referred to as transaction nodes, destination nodes, or target nodes, and may include actions). The event-condition-action rule 212 may represent a synchronization control flow pattern of a control flow based model, such as the synchronization control flow pattern 204 of FIG. 2A.

The event-condition-action-rule 212 may be based on a Rete algorithm-based model of a network of nodes, where there are three general types of nodes, including source nodes, operator nodes, and target nodes. For those types of nodes, the source nodes may represent types of events that are to enter the network at a particular point, a network of operator nodes may represent conditions, and the target nodes may represent actions (which may more broadly be transactions) of an event-condition-action rule. Execution of an event-condition-action rule by a correlation engine in that paradigm may include performing a lookup of rules having source nodes that correspond to instances of objects of particular types, evaluating conditions for those instances in accordance with a network of operator nodes, and, if conditions evaluate successfully, performing transactions, which may include executing a script, executing a program (e.g., a JAVA language program or any other computer implemented language), updating instances to cause a further evaluation of rules (e.g., altering attributes of instances, creating instances, or deleting instances), and the like.

Evaluation of the event-condition-action rule 212 may be preceded by the following example operation of a system including a state correlation engine. Predecessor transactions may be executed (e.g., transactions representing the first, second, and third tasks 206, 208, 210 of FIG. 2A) and those respective transactions may set instances tokenl, token2, and token3 of type Token to a state that matches the evaluation predicates of filter operators 226, 234, 236. The correlation engine may perform a lookup of source nodes of event-condition-action rules having type information of the instance of the type Token. Those source nodes that match the type of the instance may be flooded with events corresponding to the instances of type Token such that the rules corresponding to the source nodes are implicitly evaluated, including the rule of FIG. 2B. For each of the rules to be evaluated, an event that has before and after images representing attributes of a state variable that is an instance of type Token may be passed along each of the respective networks representing the rules along with events corresponding to the respective type of instance for a process instance (e.g., to match the process instance 222 source node).

Following the example operation, evaluation of the event-condition-action rule 212 may further be as follows. When an event having images corresponding to an instance of a type Token is passed to the event-condition-action rule 212, that event is matched with the token 220 source node. As mentioned above, the process instance 222 is to match an event of an instance of a type of object called "process instance" or "Instance", where a type process instance may represent a type of object that exists throughout a lifecycle of a run-time process instance and includes information related to the run-time process instance, where the event may be generated as a result of a change of state of the instance (e.g., completion of execution of a process instance). At a first join operator 224, pairs of events of instances of token objects corresponding to events of instances of process instance objects are computed, as indicated by the process instance 222 being paired with the token 220 as input to the join operator 224. Events may arrive at different times and their pairs may be computed as pairs are determined to exist. Then, pairs of token and process instance events are filtered by the three filter operators 226, 234, 236 in accordance with states of corresponding ingoing connectors of an AND merge gateway of a corresponding flow model (e.g., the flow model of FIG. 2A) that may be part of a synchronization control pattern. If filter conditions are met, evaluation of the event-condition-action rule 212 may continue; otherwise, the evaluation of the event-condition-action rule 212 may end (and, for example, may continue when new, additional events propagate down the network). The filter conditions of the filter operators 226, 234, 236 may be that state in which tokens must be before a merge (e.g., all tokens to be joined may be in a state ready for synchronization, such as a state indicated all predecessor activities (e.g., tasks 1, 2, and 3) have completed). The condition network 216 may be configured for a merge of three threads that may be represented by three tokens. To that end, the second and third join operators 228, 230 may provide a cascading join of three distinct tokens representing three distinct threads with a same process instance. In particular, the second join operator 228 may take as input a first and second token and may join them those tokens having a same process instance (e.g., a token 1 and a token 2 having a same process instance), and the third join operator 230 may take as input the result from the second join operator 228 and a third token and may join those tokens having a same process instance (e.g., a combination of token 1 and token 2 having a same process instance may be joined with a token 3 having a same process instance as tokens 1 and 2).

As a further description of how join operators may function, the following is a description of the combination of the token 220, process instance 222, and the join operator 224. In general, a source node may receive multiple events (at the same time or in serial order). For example, the token 220 source node may receive events corresponding to a token instance token1 being flipped to state "post task 1" (e.g., corresponding to an end of the first task 206) and a token instance token2 being flipped to a state "post task 2" (e.g., corresponding to an end of the second task 208). To perform joins, join operators may keep an internal matching table of events of instances received and any matching pair of events (according to a join predicate) from a left and right column may be the result of the join operator. For example, the join operator 224 may include a table include a left column containing identification of "Instance" events and a right column identifying "Token" events. A pair of the instance and token events may be a result of the join operator 224 (i.e., any token that belongs to a process instance). Following the example of a token instance token1 and a token instance token2 being evaluated, two pairs (I, T1) and (I, T2) may be a result of the join operator 224 and sent to the filter operators 226, 234, 236 (which may occur by having output of join 224 duplicated with a copy sent to each of the successor nodes 226, 234, 236).

The transactions 218 represent transactions to be performed at the end of the evaluation of the condition network 216. The transactions 218 include a header (also referred to as a signature) that includes information about the transaction, including a name of the transactions 218 ("and merge") and a combination of input parameters (e.g., BPMNAdapter:Token token1 may represent an input parameter token1 of type BPMNAdapter:Token), and a body that includes conditions and commands to be performed (e.g., token1:state=<post AND merge> may indicate that the state attribute of the token1 variable named state is to be changed to the value <post AND merge>); a mapping of input parameters to instances may be determined by the upstream trigger network (e.g., the source nodes may indicate which instance is to be the first token, token1). In the event-condition-action rule 212 that is expressed as a trigger network, the transactions 218 include changing an attribute named state of a first instance of type token to a post merge state (e.g., which may correspond to a label of a connector that "leaves" an AND merge of a flow control paradigm) and deleting a second and a third instances of type token of the merged token, which may result in a single instance of type token for a thread to follow an and-merge gateway represented by the event-condition-action rule 212 (i.e., synchronize three threads to one).

In general, the transactions 218 may be written in a scripting language which may be platform independent such that a model for a correlation engine may be platform independent. For example, different correlation engines running on different platforms may interpret a same set of actions in accordance with a scripting language and perform the same operations. In implementations, the transactions 218 may be implemented in a native computer-implemented language that is platform-dependent.

To generate the event-condition-action rule 212 from a workflow model, a compiler may have a library of type information, condition networks, and the like that correspond to control flow elements of a workflow language (e.g., a workflow modeling, notation language, or both) and the compiler may generate a combination of type information, condition networks, and the like to represent a workflow model based on the library of types of networks representing event-condition-action rules. For example, a compiler may map control flow elements to their representation in a paradigm including networks of nodes representing event-condition-action rules, generate copies of the networks, and link the copies of the networks to generate a set of networks representing a workflow diagram. In particular, a compiler may independently map source model artifacts (e.g., a gateway in BPMN) to sets of target model artifacts (e.g., type information, event-condition-action rule(s) expressed in trigger networks, and transactions). The sets of target model artifacts may be linked to express complete semantics of a source model such that all types, and transactions and the linked trigger network may be deployed in one unit to an execution system.

As instances of types of objects may store attributes that reflect events and the attributes may be updated by transactions or other events, the instances of types may be considered stateful. This statefulness may be retained for evaluation of a single network and for evaluation across different networks. For example, an instance of an object of a process instance type described above may be maintained across evaluation of many networks that represent a process lifecycle of a run-time process instance.

As evaluation of rules (including possible execution of transactions) may cause more rules to be evaluated, a state correlation engine to process the rules may be considered to perform a continuous evaluation of rules. For example, in response to information from an adapter indicating a new email (electronic mail) has been received, an instance of an object of type "message" that represents an email may be generated and attributes of the instance may be populated with values extracted from the email. Then, an event including an image of the instance may be generated (e.g., it may include an empty before image and an after image with values from the email). A first network representing an event-condition-action rule that correlates emails with subscribers may have events represented by types, similar to the types 214, with one of the types being a message type. Based on the message type of the first network being the same as the event including an after image of the instance of the message type, a condition network of the first network may be evaluated. The condition network may include filters including a filter node for a particular subscriber list that filters events with a group identifier "1337" (i.e., an attribute of a message that is extracted to an attribute of an instance of type message and becomes part of an after image of an event object) and leads to a first transaction. Based on the event including a group identifier attribute with the value 1337, the first transaction may be caused to be performed. The first transaction may be a script that updates the instance to add individual recipient identifiers of subscribers belong to the group with the identifier 1337. For example, the instance may have three identifiers of message recipients added. After completion of the first transaction, a state correlation engine may evaluate a set of rules with the updated instance which may result in rules having condition networks with filters matching individual subscribers to be evaluated, which may result in successful evaluation of those condition networks, which in turn may result in transactions being performed, which in turn may result in additional rules being evaluated with updated instances of the type message. Thus, state of an instance may be maintained after transactions are performed by a state correlation engine such that state is maintained across rules.

Figure 3:
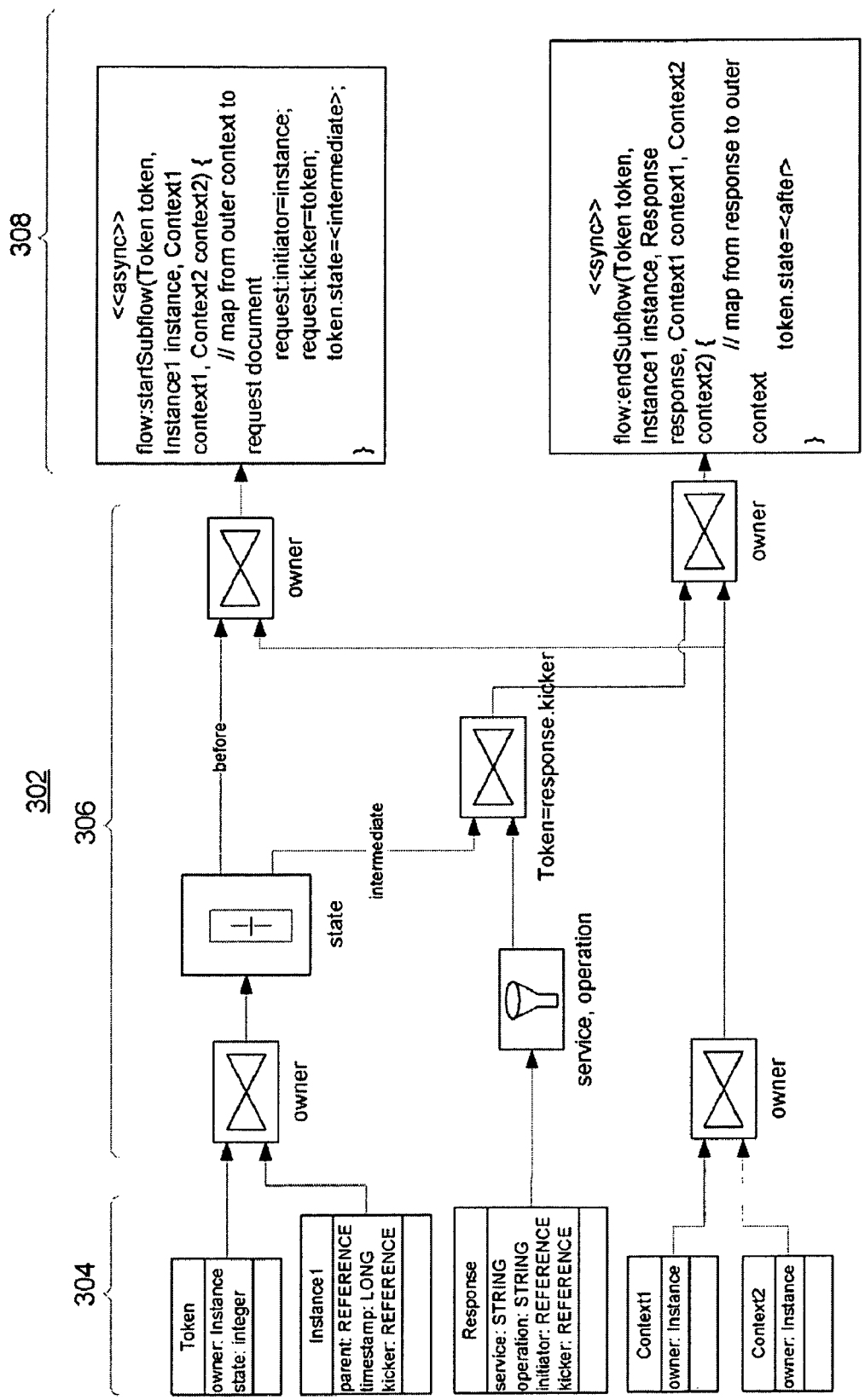
FIG. 3 is a diagram of an event-condition-action rule for independent subflows for execution by a state correlation engine.

FIG. 3 is a diagram of an event-condition-action rule 302 for independent subflows for execution by a correlation engine. In general, the event-condition-action rule 302 includes types 304, a condition network 306, and transactions 308. The components of the event-condition-action rule 302 of FIG. 3 may represent similar functionality as the components of the event-condition-action rule 212 of FIG. 2B. For example, the condition network 306 is an acyclic graph that may be evaluated by a correlation engine based on instances of the types 304. As another example, the transactions 308 may be action scripts to be executed as a result of evaluation of the condition network 306. The event-condition-action rule 302 represents a more complex control flow artifact, in contrast to the event-condition-action rule 212 of FIG. 2B, that may be part of a model for a correlation engine, though there may be more complex control flow artifacts.

In general, the event-condition-action rule 302 may be used to expose workflows in a fashion similar to synchronous web services (i.e., an incoming request may trigger a workflow which sends out a response to continue the outer flow when it ends). The event-condition-action rule 302 covers both a synchronous provisioning of a flow (e.g., as a web service) and the invocation of a subflow from an outer flow (through the respective transactions 308). To perform that, invoking a subflow may construct a "request" object and the outer flow (where a branch of the outer flow that has triggered a subflow is "on hold" while the subflow executes) may continue executing, where the subflow may send a response to cause a branch that called the subflow to continue execution (where, a matching of a response to the subflow from which it came may be used to determine whether to continue execution of the branch that called the subflow). The rule represented by an event-condition-action rule 302 for independent workflows may invoke a subflow with a signature of the subflow (where the signature may be normalized on a Web Services Description Language-style interface which may have eXtensible Markup Language Schema Definition typed parameters and responses). Roughly, there may be two transitions generated for a "workflow reference" model element, which may be referred to as an "independent or linked-in subflow invocation". Initially (i.e., when a control flow has "arrived" at a subflow activity), an asynchronous transition may take care of generating a request document that matches the operation/service as set in (e.g., the WSDL interface of) a workflow reference model element. It may also switch a token state of the outer flow to an intermediate state signaling the execution of a subflow. Two attributes "initiator" and "kicker" may contain the instance and token objects of a calling process. The "initiator" attributes may be used by the subflow to identify the outer flow (e.g., to be able to traverse the call stack) whereas the "kicker" attribute may serve as correlation criterion for the outer flow (i.e., continue the outer flow when there is a "response" document that has a "kicker" attribute that equals the "waiting" token of the outer flow). A key extraction mechanism may be applied to a "request" document and an inner process may correlate on the service, operation, and request payload to start the subflow. Vice versa, each end event within the subflow may generate a "response" document and set the subflow instance as initiator and the original (outer) token reference as "kicker". A synchronous "endSubflow" transition may check for (1) the token being in the intermediate (waiting) state and (2) the existence of a "Response" document with the right service, operation, and kicker.

Figure 4A:
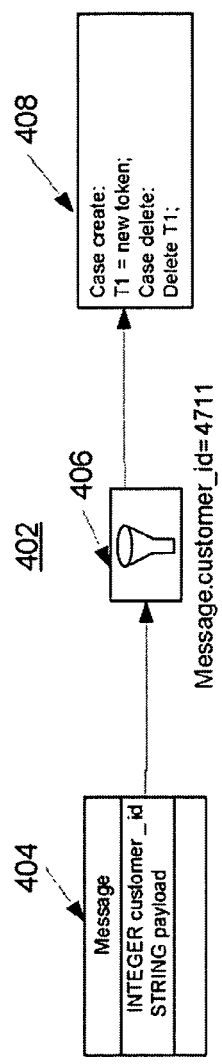
FIGS. 4A-4C include diagrams of event-condition-action rule networks that correspond to message filtering and message correlation.
Figure 4B:
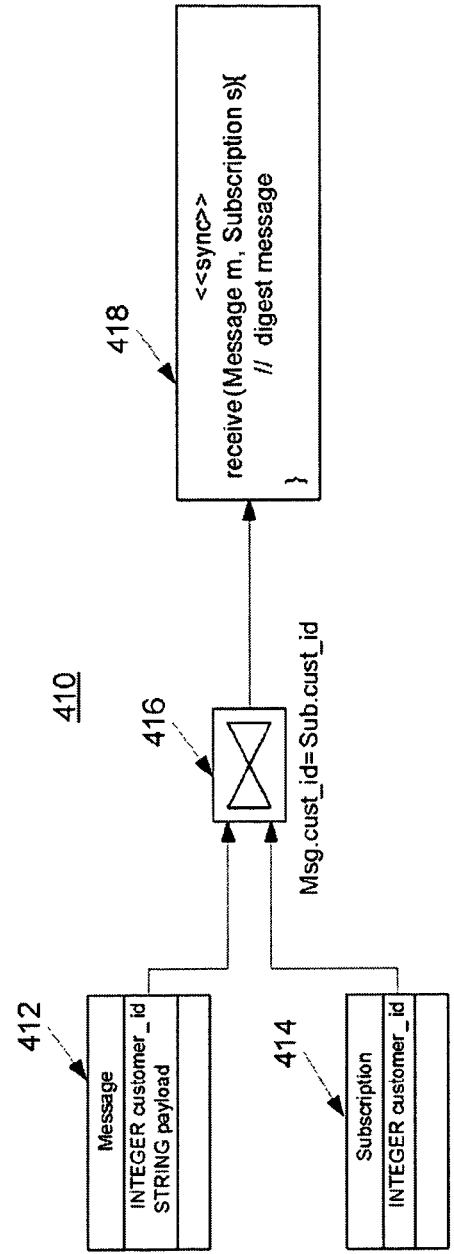
Figure 4C:
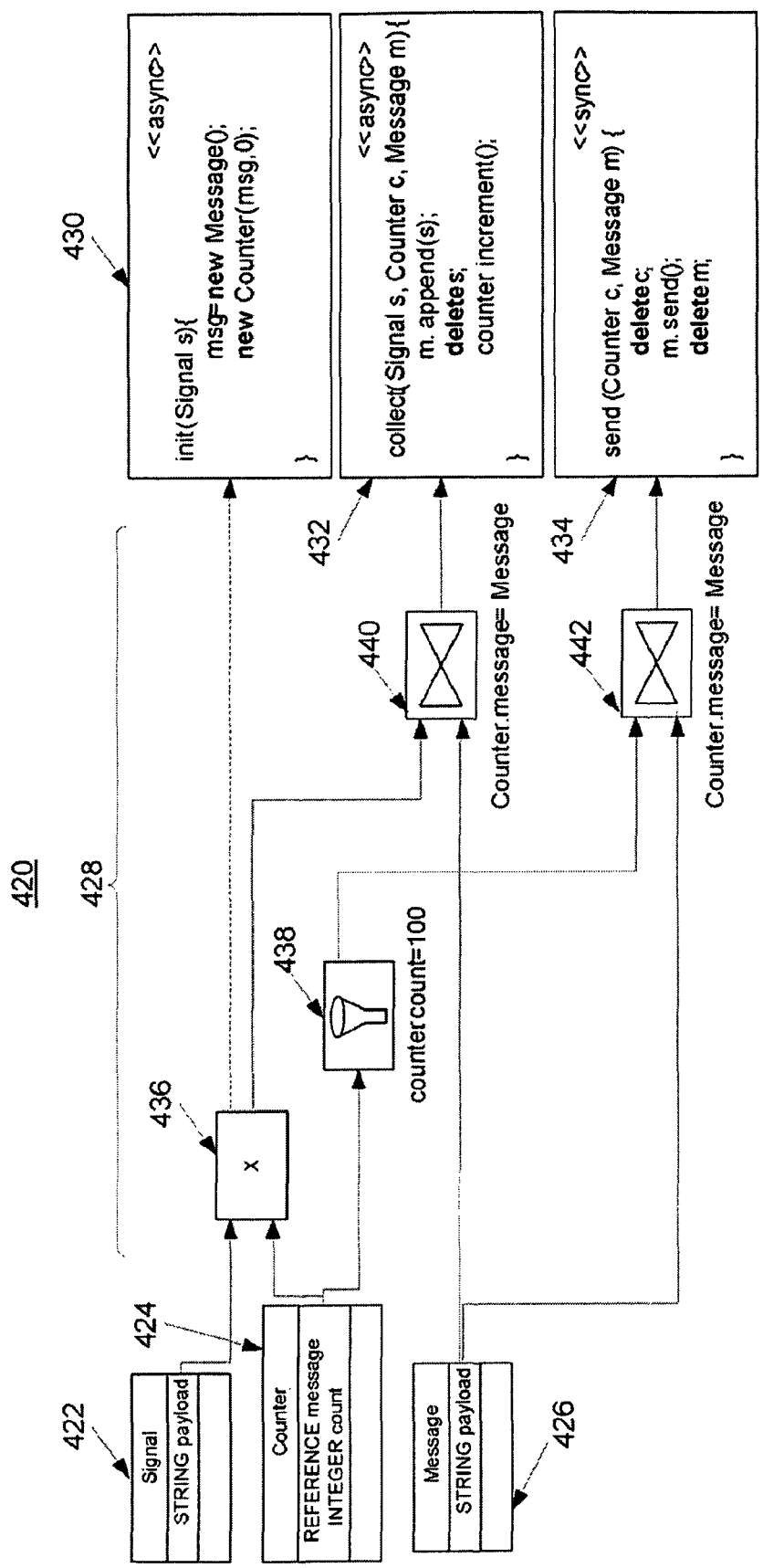

FIGS. 4A-4C include diagrams of event-condition-action rule networks that correspond to message filtering and message correlation. In FIG. 4A, an event-condition-action network 402 includes a source node 404 of type message connected to a filter condition node 406, which is connected to a destination node 408 that performs a transaction "T1." In general, the event-condition-action rule represented by the network 402 may be referred to as a plain filtering network. In that network, the filter condition node 406 applies a comparison predicate that effectively filters events comprising images of instances that meet criterion of the filter condition node 406 such that any matching events will be forwarded to the destination node associated with a transaction T1, where the transaction of the target node 408 may be executed.

In general, destination nodes (which may also be referred to as target nodes) may enable transactions for incoming create events, disable transactions for incoming delete events, and interpret alter events as being a create event succeeded by a delete event. Transactions may stay enabled as long as they are not disabled and may be repeatedly executed (e.g., executed multiple times) until they are disabled (in implementations, if an event causes a transaction to be enabled such that it may be executed multiple times, a normal transaction may disable itself as a result of performing actions that disable its preconditions). Thus, for example, using the network 402, if a new message instance having a customer_id of value 4711 and a payload of "some payload" is created, an event that may be referred to as a create event may be generated that has an empty before image and an after image with the given attributes. That event may be matched against the source node 404 for referring to a type message and passed to the filter condition node 406. The filter condition node may apply individually the selection predicate on both images in the event. The empty before image and the after image may match the criterion of the filter condition node 406 such that the event may be forwarded to the destination node 408 as-is, in response to which the actions of T1 may be performed in accordance with the destination node 408.

In FIG. 4B, an event-condition-action network 410 includes source nodes 412, 414 corresponding to types message and subscription that are connected to a join operator node 416, which is connected to a destination node 418 that includes actions (not shown) that may cause a message to be digested when the destination node 418 is enabled. In general, the event-condition-action rule represented by the network 410 may be referred to as a message subscription correlation network that correlates, based on an equivalence of a customer_id attribute, events having images of instances of objects of type message with corresponding events having images of instances of objects of type subscription.

A business process for message correlation may involve having multiple consumers receive message based on individual correlation criteria. To implement that, each party may specify the exact messages it wants to receive by using a "Subscription" object having a "customer_id" attribute whose value must match the respective counterpart in the "Message" objects. Consumers, represented by subscription instances, may have different customer_id values to reflect interests in different messages. This dynamic correlation scenario is implemented in the network 410 using the join operator node 416 which matches events from two channels. By doing so, the join operator node 416 may be executed to combine events referring to a message and subscription to pairs. As joins are stateful operators, they may store after images of events from different rounds in an internal table.

For example, a party having a customer identifier of 4711 and a party having a customer identifier of 4712 may subscribe to messages with the keys 4711 and 4712, respectively. Generating events for the subscriptions may include generating image pairs that include empty before images and after images that include the respective customer identifiers. Events including those image pairs may enter the join operator node 416 on an input channel as indicated by the subscription node 414 connected to the join operator node 416. The after images from those events may be stored in a column (e.g., a right column) of an internal join table of the join operator node 416 (where another column (e.g., a left column) would remain blank for the message after images). If a new message including the customer identifier 4711 is received at a state correlation engine, a respective message instance including that customer identifier may be generated and the state correlation engine may cause an event to enter the join operator node 416 on an input channel as indicated by the connection between the message node 412 and the join operator node 416. The after image of that message instance may be stored in a column (e.g., a left column) of the join table for message instance images and all matching images from another column (e.g., a right column) corresponding to the subscription images may be identified, which includes the subscription having the customer identifier 4711. The pair of matching images may be created and put into a combined event that is passed to the destination node 418, which may be enabled and the pair may be digested by an execution of actions of the destination node 418 (e.g., the party matching the subscription instance may receive the pair and consume the message). If the message instance having the customer identifier 418 is subsequently deleted, a respective delete event containing an empty after image may enter the join operator node 416 and the corresponding entry in a column of the join table may be deleted. A combined delete event including images from the message and subscription instances may be passed to the destination node 418 where the respective transaction may be disabled.

In FIG. 4C, an event-condition-action network 420 includes source nodes 422, 424, 426 of types signal, counter, and message that are connected to a condition network 428, which is connected to destination nodes 430, 432, 434 that may cause correlation of messages. In general, the event-condition-action rule represented by the network 420 may be referred to as a complex correlation rule in contrast to the correlation rule 410 of FIG. 4B because in the condition network 428, operators are chained to express more complex correlation scenarios; however, there may exist even more complex correlation scenarios.

The network 420 implements "Init", "Collect", and "Send" transactions, which may refer to transactions of a continuous execution message correlation business process. In an implementation of that process, a state correlation engine may continue to execute transactions as long as state changes that are caused by these transactions trigger successor transactions, thus the implementation may be considered to have a continuous execution of rules.

The business process of the network 420 may reflect a scenario where incoming signals from an RFID (Radio Frequency Identification) reader are to be collected over time and sent out in a chunk of 100 signals to a business system. The three transactions Init, Collect, and Send reflect a first transaction Init to be enabled whenever a new RFID signal has come in but no counter for counting a number of incoming signals exists, a second transaction Collect is enabled whenever a new RFID signal has come in and a counter exists, and a third transaction Send to be enabled when a 100th message has arrived. The transactions may include the following pseudo-code: Init: When [new RFID signal has come in] and [no counter exists], create counter and set it to 0; Collect: When [new RFID signal has come in] and [counter variable is less than 100], remove RFID signal, increment counter and aggregate signal into message; Send: When counter variable is 100, send out message, remove counter. The "Collect" and "Send" may be triggered successively if "Send" was enabled by "Collect" (by increasing the counter to 100) while "Init" would always be succeeded by "Collect" which is enabled by the creation of a new counter.

To implement the example process, the network 420 uses a Cartesian product operator 436 (which offers generalized join semantics with a join predicate that always holds whenever there are entries in both columns of an internal join table) and an inhibitor output channel that may be combined with other operators, such as join and Cartesian product operators. As discussed above, inhibitors add negated existence quantifier semantics to a condition network implementation (i.e., facilitate predicates that check for the absence of a matching partner). For example, an inhibitor output channel is employed as an output of the Cartesian product operator node 436 to express a predicate as found in a condition of the "Init" transition that is to be triggered whenever a signal instance comes in but no counter instance exists (note, the use of the dashed line to express the inhibitor as an output channel of the Cartesian product operator node 436 output which is connected to the signal source node 422 and the counter source node 424). As another example, the "Collect" transaction requires a counter instance and signal instance, in combination with a message instance before the transaction is triggered, which is expressed by the sequential chaining of the Cartesian product operator node 436 and the join operator node 440.

As shown above, nodes may be chained. For example, the "Send" transaction is to be triggered whenever the counter has reached its threshold of 100 and a message instance exists, as expressed by the chaining of the filter operator node 438 with the subsequent join operator node 442 where each operator represents a "base predicate" of an overall condition.

As shown by the multiple outputs of the "Counter" source node 424 and the message source node 426, any node (including source and condition nodes) in an event-condition-action rule network may have an arbitrary number of successors. In a case of multiple successors, outgoing events may be duplicated and a separate one is sent to each successor node. Similarly, each condition (i.e., operator) or destination node may receive events from different predecessor nodes. In this case, the condition or destination node is applied to any update coming in from any of its predecessor nodes.

Figure 5:
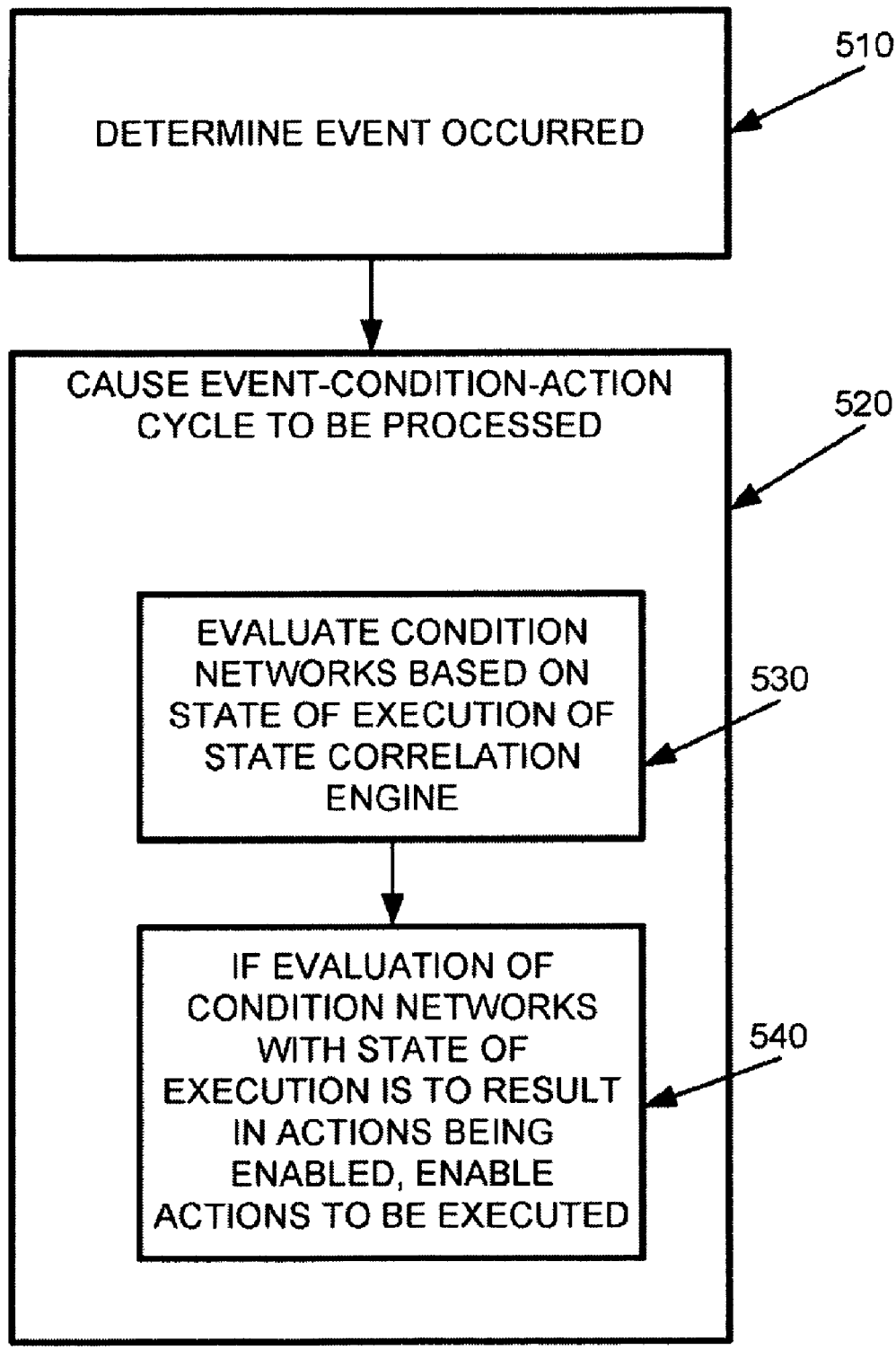
FIG. 5 is a flowchart illustrating a process to perform stateful evaluation of rules.

FIG. 5 is a flowchart illustrating a process 500 to perform stateful execution of rules. The process 500 of FIG. 5 is an example of execution of a rule that is triggered as a result of changes to a state of a state correlation engine. Such a process may occur endlessly for many rules where actions cause one or more rules to be evaluated, and the process performs in a loop (e.g., one transaction causes one rule to be evaluated which has a transaction that causes another rule to be evaluated, and so on; i.e., transactions may have effects that enable/disable follow-up rules that are, again, scheduled for execution). The process 500 may be performed by a state correlation engine, such as the state correlation engine 120 of FIG. 1. Although in FIG. 5 and its corresponding description the term action is used to describe tasks that may be enabled, the term transaction and action may be used interchangeably such that, for example, the actions of FIG. 5 may be the same as the transactions discussed above.

In general, the process 500 includes determining that an event occurred (510), and causing an event-condition-action cycle to be processed (520), which includes evaluating condition networks based on a state of execution of a state correlation engine (530) and enabling actions to be executed if evaluation of condition networks with the state of execution is to result in actions being enabled (540). The process 500 may be performed by a state correlation engine, such as the state correlation engine 120 of FIG. 1.

Determining that an event occurred (510) may include determining that a state transition has occurred, where the state transition may be a change of a state of a state correlation engine as a result of an action performed by the state correlation engine (e.g., a change of one or more state variables), or the state transition may be a result of receiving information indicating an event occurred outside the state correlation engine system (e.g., information from an adapter, if adapters are implemented, may indicate an event occurred at another system and that event may be reflected in an event generated at the state correlation engine; e.g., receiving a message at an adapter to reflect an event has occurred) and registering the event (i.e., performing actions to register the existence of event such that appropriate action, if any, may be performed in response to the event). For example, a state correlation engine may receive information from an adapter indicating an event has occurred; the state correlation engine may generate an instance of a type of object in an object-oriented language, where the type of object corresponds to the type of event and the object is populated from received data; and the state correlation engine may generate a data structure that may be referred to as an event that includes attributes from the instance. For example, a web service call may be received and information from the web service call may be used to generate one or more objects corresponding to the web service call and those objects may be populated with data from the call. As another example, when changes to instances of objects of a type language that represent a state of a state correlation engine are processed as a result of executing actions of an event-condition-action rule, those changes may be registered and an event object including before and after images of the changes may be generated.

Causing a first event-condition-action cycle to be processed (520) may include flooding event-condition-action rules with information about the event to allow for evaluation of the rules (e.g., a set of events may be used to flood event-condition-action rules having source nodes matching the events and the condition networks of the rules may be evaluated, which may result in enabling actions for execution, where the enablement may allow for repeated execution of a same set of actions multiple times until the actions are disabled). The information about the event may be referred to as events and may include a combination of before and after images of state variables that have been modified (e.g., generated, changed, or deleted). For example, for an event representing a deletion of a message, attributes of the state variable for the instance of the message may be included in a before image, and an after image may be blank or empty. The actions may include generating, altering, or deleting instances of objects that are state variables, which may result in further events to correspond to those modifications of the state variables such that an action may indirectly result in further evaluation of one or more rules (e.g., there may be an evaluation of rules performed in response to each update of an object; i.e., each update may cause a state of a state correlation engine that is updated as reflected by the updated object which may cause more rules to be evaluated). The cycle may be called an event-condition-action cycle as it may reflect the rules that are to be evaluated and executed are in the form of event-condition-action rules. Event-condition-action rules may be expressed as a network of nodes in a modeling language derived from Rete-based networks that include source, condition, and destination nodes that reflect events, conditions, and actions, respectively. All rules that match a state of execution reflected by events that reflect modifications of instances of types of objects may be flooded (i.e., evaluated), where multiple rules may be evaluated asynchronously, in parallel. Evaluating condition networks based on a state of execution of a state correlation engine (530) may include evaluating a state of execution that is based on prior events. As the evaluation of condition networks may be based on a state of execution based on prior events, the evaluation may be considered stateful. As discussed above, state may be retained by a combination of state variables and other information, such as an enablement of an action.

Enabling actions to be executed if evaluation of condition networks with the state of execution is to result in actions being enabled (540) may include indicating that an action may be performed. The action may be performed by an event scheduler that may be a component of a state correlation engine. The action may be performed asynchronously. An action that is enabled may be performed any number of times until the action is disabled, which may occur as a result of another action being performed. In some cases evaluation of rules might not result in enablement of an action. For example, evaluation of rules in a network representation following the example with source, operator, and target nodes discussed above might not lead to a target node such that actions of target nodes might not be enabled.

Although the process 500 of FIG. 5 includes a certain number and type of sub-processes, implementations may vary. For example, the process may include performing further event-condition-action cycles.

Similarly, although FIG. 1 includes a certain type and number of components, implementations may vary. For example, the system 100 need not include adapters and configurations for adapters (e.g., the functionality of the adapters may be incorporated into the correlation engine and need not be separately componentized). Also, the networks of FIGS. 2-4 may vary.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims.

What is claimed is:

1. A computer program product, embodied on a non-transitory computer-readable medium, the product comprising instructions to cause a data processing apparatus to perform operations comprising:
   generating an instance of a type of object to be a state variable;
   generating an event to represent the generation of the instance, the event comprising an image of the instance;
   determining that the event has occurred;
   causing an event-condition-action cycle to be processed for the event, the event-condition -action cycle comprising:
      evaluating condition networks based on a state of execution of a state correlation engine comprising the event, the condition networks operating on state changes;
      wherein the event represents:
         a generation of a state variable in the state of execution of the state correlation engine;
         a change of values of a state variable in the state of execution of the state correlation engine; or
         a deletion of a state variable in the state of execution of the state correlation engine; and
      if evaluation of the condition networks with the state of execution is to result in an action being enabled, enabling an action to be executed; determining another event has occurred; and
   causing another event-condition-action cycle to be processed for the other event, the other event-condition-action cycle comprising:
      evaluating the condition networks based on another state of execution of the state correlation engine comprising the other event and the event; and
      if evaluation of the condition networks with the other state of execution is to result in an action being enabled, enabling an action to be executed:,
   wherein:
      the evaluating the condition networks comprises flooding all source nodes of the condition networks with the event having a type corresponding to the event;
      the event comprises an empty before image to reflect no attributes before generation of the instance and an after image to store an image of attributes after the generation of the instance.

2. The computer program product of claim 1, wherein the action is executed asynchronously.

3. The computer program product of claim 2, wherein execution of the action is triggered by a dedicated scheduler component.

4. The computer program product of claim 1, wherein the event is caused by an occurrence outside of a system performing the processing of the cycles, or caused by execution of an action from evaluation of another rule.

5. The computer program product of claim 1, wherein the instance, a combination of other instances, and the condition networks make up the state of execution of the state correlation engine, the state of execution stored in main memory.

6. The computer program product of claim 1, wherein the condition networks are part of network representations of event-condition-action rules, wherein each network representation of an event-condition-action rule comprises a combination of source nodes representing types of events, operator nodes representing conditions, and target nodes representing one or more actions to be executed.

7. The computer program product of claim 6, wherein the condition networks are directed acyclic graphs of operator nodes.

8. The computer program product of claim 6, wherein the source nodes are represented as types of objects of a type language corresponding to types of images of events, where the condition networks of operator nodes are evaluated as far as possible for types of events that correspond to types of source nodes based on relationships between source nodes and the condition networks.

9. The computer program product of claim 6, wherein at least one of the target nodes corresponds to code describing one or more actions to be executed asynchronously upon enablement of the at least one target node.

10. The computer program product of claim 6, wherein at least one of the target nodes comprises a script in accordance with a scripting language to describe one or more actions to be executed asynchronously upon enablement of the at least one target node, the enablement based on successful evaluation of operator nodes connected to the target node.

11. The computer program product of claim 6, wherein the operator nodes are selected from types of operator nodes comprising a filter operator node type, a join operator node type, a cross product node type, and a projection node type.

12. A computer program product, embodied on a non-transitory computer-readable medium, the product comprising instructions to cause a data processing apparatus to perform operations comprising:
   generating instances each of a type of object to be a state variable;
   generating events each to represent the generation of the corresponding instance, each event comprising an image of the corresponding instance;
   determining one or more events have occurred; and
   causing an event-condition-action cycle to be processed for the events, the event-condition -action cycle comprising:
      evaluating condition networks based on a state of execution of a state correlation engine comprising the events, the state of execution based on a state of execution before the events;
      wherein the event represents:
         a generation of a state variable in the state of execution of the state correlation engine;
         a change of values of a state variable in the state of execution of the state correlation engine; or
         a deletion of a state variable in the state of execution of the state correlation engine; and
      if evaluation of the condition networks with the state of execution is to result in one or more actions being enabled, enabling the actions to be executed;
   wherein:
      the evaluating the condition networks comprises flooding all source nodes of the condition networks with the event having a type corresponding to the event;

the event comprises an empty before image to reflect no attributes before generation of the instance and an after image to store an image of attributes after the generation of the instance.

13. The computer program product of claim 12, wherein the condition networks are part of network representations of event-condition-action rules, wherein each network representation of an event-condition-action rule comprises a combination of source nodes representing types of events, operator nodes representing conditions, and target nodes representing one or more actions to be executed.

14. A computer program product, embodied on a non-transitory computer-readable medium, the product comprising instructions to cause a data processing apparatus to perform operations comprising:
   generating instances each of a type of object to be a state variable;
   generating events each to represent the generation of the corresponding instance, each event comprising an image of the corresponding instance;
   determining one or more events A have occurred;
   causing an event-condition-action cycle to be processed for the events A, the event -condition-action cycle for the events A comprising:
      evaluating condition networks based on a state N of execution of a state correlation engine comprising the events A; and
      if evaluation of the condition networks with the state N of execution is to result in actions X being enabled, enabling the actions X to be executed;
   determining one or more events B have occurred;
   wherein the events A and events B represent one or more of:
      a generation of a state variable in the state of execution of the state correlation engine;
      a change of values of a state variable in the state of execution of the state correlation engine; or
      a deletion of a state variable in the state of execution of the state correlation engine; and
   causing an event-condition-action cycle to be processed for the events B, the event -condition-action cycle for the events B comprising:
      evaluating the condition networks based on a state M of execution of the state correlation engine comprising the events B, the state M of execution based on the state N of execution; and
      if evaluation of the condition networks with the state M of execution is to result in actions Y being enabled, enabling the actions Y to be executed;
   wherein:
      the evaluating the condition networks comprises flooding all source nodes of the condition networks with the event having a type corresponding to the event;
      the event comprises an empty before image to reflect no attributes before generation of the instance and an after image to store an image of attributes after the generation of the instance.

15. The computer program product of claim 14, wherein the events B are the result of the action X which was enabled by evaluation of the condition networks with the events A.

* * * * *